(12) United States Patent
Ravishankar et al.

(10) Patent No.: US 9,260,635 B2
(45) Date of Patent: Feb. 16, 2016

(54) POLYOLEFIN ADHESIVE COMPOSITIONS AND METHODS FOR PREPARING THE SAME

(71) Applicant: ExxonMobil Chemical Patents Inc., Baytown, TX (US)

(72) Inventors: Periagaram S. Ravishankar, Kingwood, TX (US); Yu Feng Wang, Houston, TX (US); Luke P. Stephens, Houston, TX (US); Florin Barsan, Pearland, TX (US); Douglas A. Berti, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/378,011

(22) PCT Filed: Feb. 28, 2013

(86) PCT No.: PCT/US2013/028270
§ 371 (c)(1),
(2) Date: Aug. 11, 2014

(87) PCT Pub. No.: WO2013/134041
PCT Pub. Date: Sep. 12, 2013

(65) Prior Publication Data
US 2015/0045513 A1    Feb. 12, 2015

Related U.S. Application Data

(60) Provisional application No. 61/609,020, filed on Mar. 9, 2012.

(51) Int. Cl.
| | | |
|---|---|---|
| C08F 2/00 | (2006.01) |
| C09J 123/16 | (2006.01) |
| C08F 110/04 | (2006.01) |
| C08F 110/02 | (2006.01) |
| C08L 23/08 | (2006.01) |

(52) U.S. Cl.
CPC ............. *C09J 123/16* (2013.01); *C08F 110/02* (2013.01); *C08F 110/04* (2013.01); *C08L 23/08* (2013.01); *C08F 2/001* (2013.01); *C08L 2205/02* (2013.01); *C08L 2205/025* (2013.01)

(58) Field of Classification Search
CPC ........ C09J 123/16; C08F 2/001; C08F 10/02; C08F 10/04; C08F 110/04; C08L 23/08
See application file for complete search history.

(56) References Cited

U.S. PATENT DOCUMENTS

| | | |
|---|---|---|
| 4,540,753 A | 9/1985 | Cozewith et al. |
| 6,525,157 B2 | 2/2003 | Cozewith et al. |
| 6,881,800 B2 | 4/2005 | Friedersdorf |
| 7,033,152 B2 | 4/2006 | Eloo et al. |
| 7,163,989 B2 | 1/2007 | Friedersdorf |
| 7,226,553 B2 | 6/2007 | Jackson et al. |
| 7,470,118 B2 | 12/2008 | Fukutani et al. |
| 7,601,666 B2 | 10/2009 | Rix et al. |
| 2004/0236042 A1 | 11/2004 | Datta et al. |
| 2009/0163642 A1 | 6/2009 | Kiss |

FOREIGN PATENT DOCUMENTS

| | | |
|---|---|---|
| WO | 2006/083515 | 8/2006 |
| WO | 2009/082468 | 6/2009 |
| WO | 2009/082468 | 7/2009 |
| WO | 2011/087731 | 7/2011 |

OTHER PUBLICATIONS

Spectroscopy, 1993, vol. 47, pp. 1128-1130.
H.N. Cheng, Macromolecules, 17, pp. 1950 (1984).
Verstrate et al., Macromolecules, 21, pp. 3360 (1988).

*Primary Examiner* — Nathan M Nutter
(74) *Attorney, Agent, or Firm* — Priya G. Prasad; Chad A. Guice

(57) ABSTRACT

A blended multimodal polymer product is disclosed that comprises a first polymer, wherein the first polymer is a homopolymer of propylene or a propylene copolymer having an ethylene or a $C_4$ to $C_{10}$ olefin comonomer; and a second polymer, wherein the second polymer is a propylene homopolymer and a propylene copolymer having an ethylene or a $C_4$ to $C_{10}$ olefin comonomer, and wherein the first polymer and second polymer have a difference in heat of fusion of about 25 J/g or more. Methods for making such a polymer product using at least two reactors in parallel and for separating a propylene-based polymer from a solvent using a liquid-phase separator are also disclosed.

19 Claims, 5 Drawing Sheets

POLYOLEFIN ADHESIVE COMPOSITIONS AND METHODS FOR PREPARING THE SAME

PRIORITY CLAIM

This application claims priority to U.S. Provisional Application Ser. No. 61/609,020 filed Mar. 9, 2012, the disclosure of which is fully incorporated herein by their reference.

CROSS-REFERENCES TO RELATED APPLICATIONS

This application claims priority to U.S. Patent Application Ser. No. 61/609,020 filed Mar. 9, 2012 and International Patent Application PCT/US2013/028270 filed Feb. 28, 2013, which are incorporated by reference herein in their entireties.

FIELD OF INVENTION

The invention relates to a polyolefin adhesive component composition that is a blend of at least two olefin-based polymers. The invention further relates to a method of producing such polyolefin adhesive component compositions using reactors in parallel and a method for separating a propylene-based polymer from solvent using a liquid-phase separator.

BACKGROUND

Adhesive composition components, such as base polymers, tackifiers, and waxes are customarily provided as separate components for formulation into an adhesive composition. For hot melt adhesive (HMA) application systems, the base polymer is often supplied in the form of solid pellets, which may be melted and combined with the other adhesive components.

In HMA applications, improved adhesive compositions are sought that provide a desired combination of physical properties, such as reduced set time and improved mechanical strength. In some instances, individual polyolefins having certain characteristics have been blended together in the hopes of combining the positive attributes of the components. Typically, however, the result is a blend that displays a weighted average of the individual properties of the individual resins.

Although many polymers have been discovered that possess new and interesting properties, many potentially advantageous polymers have not been employed in adhesive compositions or otherwise explored for a myriad of reasons, including apparent processibility limitations. For example, some polymers may be difficult to process because of the apparent impracticability of pelletizing the polymer at commercial processing speeds. Some polymers, particularly those having an exceptionally low heat of fusion, may pass too readily through a pelletizer without forming well-defined pellets. Other polymers, particularly those having an exceptionally high heat of fusion, may not tolerate standard process condition variability (e.g., temperature variations) and as a result may plug the die plate.

SUMMARY

The foregoing and/or other challenges are addressed by the methods and products disclosed herein.

In one aspect, a method is provided for making a multimodal polymer product. The method includes producing a first polymer in a first reactor, wherein the first polymer is a propylene homopolymer or a propylene copolymer having an ethylene or a $C_4$ to $C_{10}$ olefin comonomer, and producing a second polymer in a second reactor in parallel with the first reactor, wherein the second polymer is a propylene homopolymer or a propylene copolymer having an ethylene or a $C_4$ to $C_{10}$ olefin comonomer. The first polymer and second polymer have a difference in heat of fusion of about 25 J/g or more. The first polymer and the second polymer are combined to form a multimodal polymer blend, and the multimodal polymer blend is pelletized to form a plurality of pellets comprising the multimodal polymer blend.

In another aspect, a blended multimodal polymer product is provided. The polymer product includes a first polymer that is a propylene homopolymer or a copolymer of propylene and ethylene or a $C_4$ to $C_{10}$ olefin, and a second polymer that is a propylene homopolymer or a copolymer of propylene and ethylene or a $C_4$ to $C_{10}$ olefin. The first polymer and second polymer have a difference in heat of fusion of about 25 J/g or more.

In yet another aspect, a method is provided for processing a polymer. The method includes providing a liquid-phase separator having an inlet, a solvent outlet, and a product outlet; and supplying a product stream downstream of one or more reactors to the inlet of the liquid-phase separator. The product stream comprises a propylene-based polymer, a solvent, and unreacted propylene monomers. The propylene-based polymer has a weight average molecular weight of about 100,000 g/mole or less. The method further includes operating the liquid-phase separator under conditions suitable to produce a polymer lean liquid phase and a polymer rich liquid phase; removing a portion of the solvent from the liquid-phase separator via the solvent outlet; and discharging the polymer rich phase from the liquid-phase separator via the product outlet.

These and other aspects of the present inventions are described in greater detail in the following detailed description and are illustrated in the accompanying drawings.

DETAILED DESCRIPTION

Figure 1:
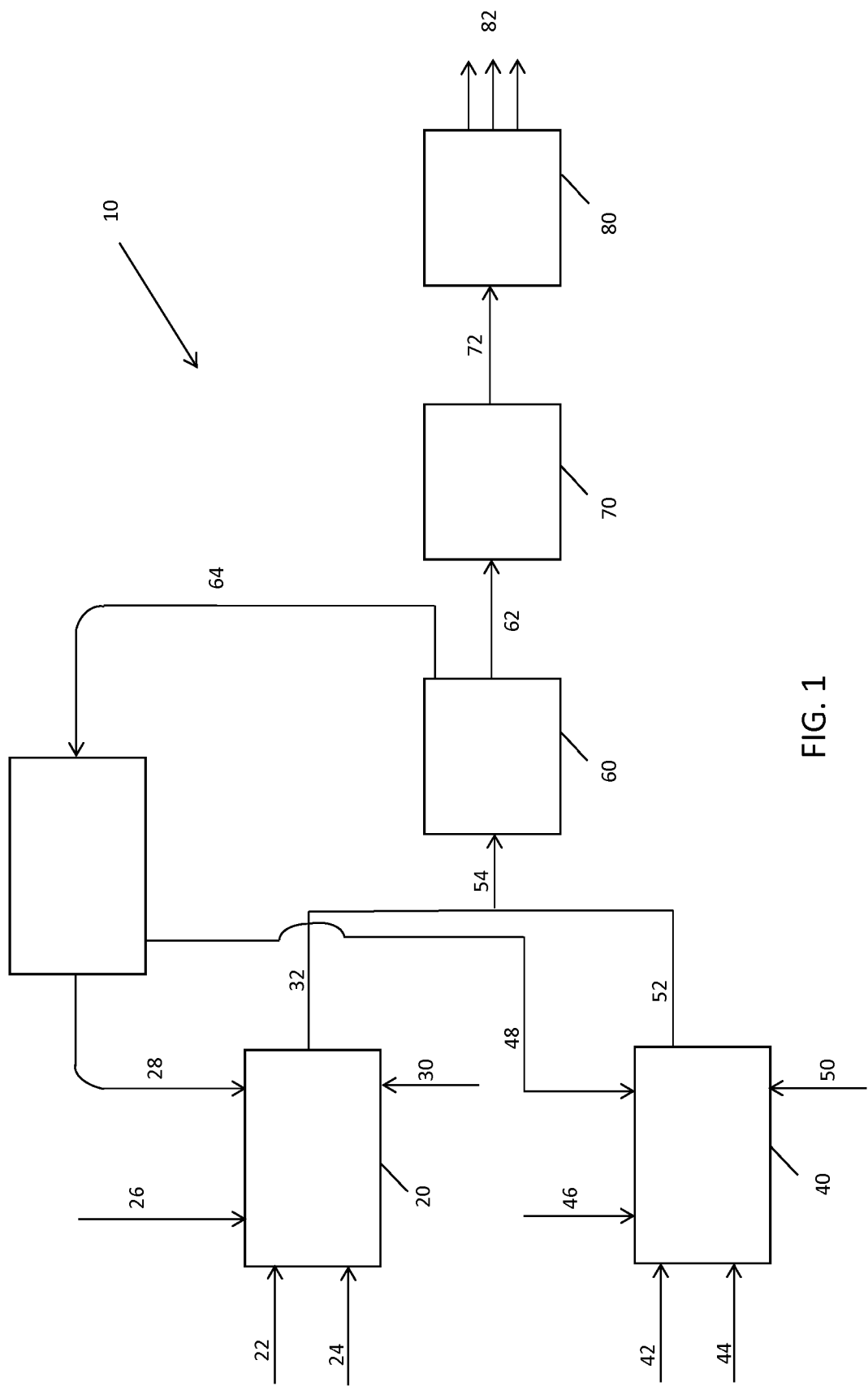
FIG. 1 depicts a generalized process for preparing a polyolefin adhesive component.

It has been discovered that certain multimodal polymer blends have a unique and desirable combination of advantageous properties for adhesive applications, including short set time and good mechanical strength. For example, it has been discovered that particularly advantageous properties can be achieved by using an exceptionally low crystalline propylene-based polymer in combination with a higher crystalline propylene-based polymer. In addition, particularly advantageous adhesive properties can be achieved by using an exceptionally high crystalline propylene-based polymer in combination with a lower crystalline propylene-based polymer.

The term "exceptionally low crystalline propylene-based polymer" as used herein refers to a homopolymer of propylene or a copolymer of propylene and ethylene or a $C_4$ to $C_{10}$ olefin having a heat of fusion of 15 J/g or less. The term "exceptionally high crystalline propylene-based polymer" as used herein refers to a homopolymer of propylene or a copolymer of propylene and ethylene or a $C_4$ to $C_{10}$ olefin having a heat of fusion of about 80 J/g or more. The term "exceptionally" refers to the fact that such degrees of crystallinity are unusual and exceptional in propylene-based adhesive systems.

The methods disclosed herein have a broader applicability to many other multimodal polymer blends that have a combination of properties that are beneficial for use in adhesive compositions. Generally, methods are disclosed for producing multimodal blends in which the blend includes at least two polymers having a difference of heat of fusion of about 25 J/g or more, or about 30 J/g or more. For example, the methods disclosed herein may be employed to pelletize a multimodal polymer blend in which one polymer has a heat of fusion of about 30 J/g or less, and a second polymer has a heat of fusion of about 60 J/g or more. The methods disclosed herein may be employed to pelletize a multimodal polymer blend in which one polymer has a heat of fusion of about 10 J/g to about 20 J/g, and a second polymer has a heat of fusion of about 65 J/g to about 85 J/g. In any embodiment, the weight ratio of first polymer to second polymer present in the blend may be 10:90 to 90:10, or 20:80 to 80:20, or 30:70 to 70:30, or 40:60 to 60:40.

It also has been determined that polymers that have previously presented challenges to pelletization, namely exceptionally high crystalline propylene-based polymers and exceptionally low crystalline propylene-based polymers, may be successfully pelletized at commercial processing speeds by producing the polymer in a parallel reaction process with a lower crystalline polymer (in the case of the exceptionally high crystalline propylene-based polymer) or a higher crystalline polymer (in the case of the exceptionally low crystalline propylene-based polymer) and combining the polymers to form a multimodal polymer blend prior to pelletizing the polymers. Without being bound by theory, it is believed that the use of a higher crystalline propylene-based polymer may act as a nucleating agent to promote the crystallization of an exceptionally low crystalline propylene-based polymer as the multimodal polymer blend solidifies from the melt. Similarly, it is believed that the use of a lower crystalline propylene-based polymer with an exceptionally high crystalline propylene-based polymer may act to slow the crystallization of the multimodal polymer blend.

These developments have particular utility for exceptionally high crystalline propylene-based polymers that have an exceptionally low melt viscosity. The term "exceptionally low melt viscosity" as used herein refers to propylene-based polymers having a melt viscosity (measured at 190° C.) of about 500 cP to about 2000 cP, and more particularly to propylene-based polymers having a melt viscosity of about 500 cP to about 1000 cP. These polymers tend to crystallize very rapidly and may not tolerate standard processing temperature variations that tend to occur between the reactor and a pelletizing die when they are not blended with lower crystalline propylene-based polymers.

These developments also have particular utility to exceptionally low crystalline propylene-based polymers. These polymers tend to crystallize very slowly and therefore may not be capable of solidifying at commercial processing speeds when they are not blended with higher crystalline propylene-based polymers.

It also has been discovered that, when operating in a parallel reaction scheme, advantageous properties may be achieved by utilizing dimethylsilyl bis(2-methyl-5-phenylindenyl)zirconium dichloride; dimethylsilyl bis(2-methyl-5-phenylindenyl)zirconium dimethyl; dimethylsilyl bis(2-methyl-5-phenylindenyl)hafnium dimethyl; or dimethylsilyl bis (2-methyl-5-phenylindenyl)hafnium dichloride as a catalyst to produce a relatively high crystalline polymer and dimethylsilylbis(indenyl)hafnium dimethyl; dimethylsilylbis(indenyl)hafnium dichloride; dimethylsilylbis(indenyl)zirconium dichloride; and or dimethylsilylbis(indenyl)zirconium dichloride as a catalyst to produce a relatively low crystalline polymer. Furthermore, such catalysts may improve the recovery of the polymer blend when processing propylene-based polymer blends that include a relatively low molecular weight polymer.

It also has been discovered, surprisingly, that propylene-based polymers having a weight average molecular weight of about 100,000 g/mole or less, and even more preferably about 60,000 g/mole or less, may be separated from solvent in a liquid-phase separator using spinodal decomposition without losing a significant amount of polymer in the polymer lean liquid phase. Polymer concentration in the lean polymer liquid phase may be further reduced by using catalysts such as dimethylsilyl bis(2-methyl-5-phenylindenyl)zirconium dichloride, dimethylsilyl bis(2-methyl-5-phenylindenyl)zirconium dimethyl, dimethylsilyl bis(2-methyl-5-phenylindenyl)hafnium dichloride, and dimethylsilyl bis(2-methyl-5-phenylindenyl) hafnium dimethyl.

I. Methods of Preparing Polyolefin Adhesive Components and Compositions

A process for preparing a polyolefin adhesive component is generally illustrated in FIG. 1. In an example embodiment, the process is performed by a system 10 that includes a first reactor 20, a second reactor 40 in parallel with the first reactor 20, a liquid-phase separator 60, a devolatilizing vessel 70, and a pelletizer 80. The first reactor 20 and second reactor 40 may be, for example, continuous stirred-tank reactors.

The first reactor 20 may receive a first monomer feed 22 of a first monomer, a second monomer feed 24 of a second monomer, and a catalyst feed 26 of a first catalyst. The first reactor 20 may also receive feeds of a solvent and an activator. The solvent and/or the activator feed may be combined with any of the first monomer feed 22, the second monomer feed 24, or catalyst feed 26 or the solvent and activator may be supplied to the reactor in separate feed streams 28, 30. A first polymer is produced in the first reactor 20 and is evacuated from the first reactor 20 via a first product stream 32. The first product stream 32 comprises the first polymer, solvent, and any unreacted monomer.

In any embodiment, the first monomer may be propylene and the second monomer may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final multimodal polymer blend. For adhesive compositions, ethylene and hexene are particularly preferred comonomers for copolymerization with propylene. In any embodiment, the relative amounts of propylene and comonomer supplied to the first reactor 20 may be designed to produce a polymer that is predominantly propylene, i.e., a polymer that is more than 50 mole % propylene. In another embodiment, the first reactor 20 may produce a homopolymer of propylene.

The second reactor 40 may receive a third monomer feed 42 of a third monomer, a fourth monomer feed 44 of a fourth monomer, and a catalyst feed 46 of a second catalyst. The second reactor 40 may also receive feeds of a solvent and activator. The solvent and/or the activator feed may be combined with any of the third monomer feed 42, the fourth monomer feed 44, or second catalyst feed 46, or the solvent and activator may be supplied to the reactor in separate feed streams 48, 50. A second polymer is produced in the second reactor 40 and is evacuated from the second reactor 40 via a second product stream 52. The second product stream 52 comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor 40 may be designed to produce a polymer that is predominantly propylene, i.e., a polymer that is more than 50 mole % propylene. In another embodiment, the second reactor 40 may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous multimodal blends are described in greater detail herein.

Although not illustrated in FIG. 1, it should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor 20 and second reactor 40 or the third reactor may be in series with one of the first reactor 20 and second reactor 40.

Further description of exemplary methods for polymerizing the polymers described herein may be found in U.S. Pat. No. 6,881,800, which is incorporated by reference herein.

The first product stream 32 and second product stream 52 may be combined to produce a multimodal blend stream 54. For example, the first product stream 32 and second product stream 52 may supply the first and second polymer to a mixing vessel, such as a mixing tank with an agitator.

The multimodal blend stream 54 may be fed to a liquid-phase separation vessel 60 to produce a polymer rich phase and a polymer lean phase. The polymer lean phase may comprise the solvent and be substantially free of polymer. At least a portion of the polymer lean phase may be evacuated from the liquid-phase separation vessel 60 via a solvent recirculation stream 64. The solvent recirculation stream 64 may further include unreacted monomer. At least a portion of the polymer rich phase may be evacuated from the liquid-phase separation vessel 60 via a polymer rich stream 62.

In any embodiment, the liquid-phase separation vessel 60 may operate on the principle of lower critical solution temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel 60.

Figure 3:
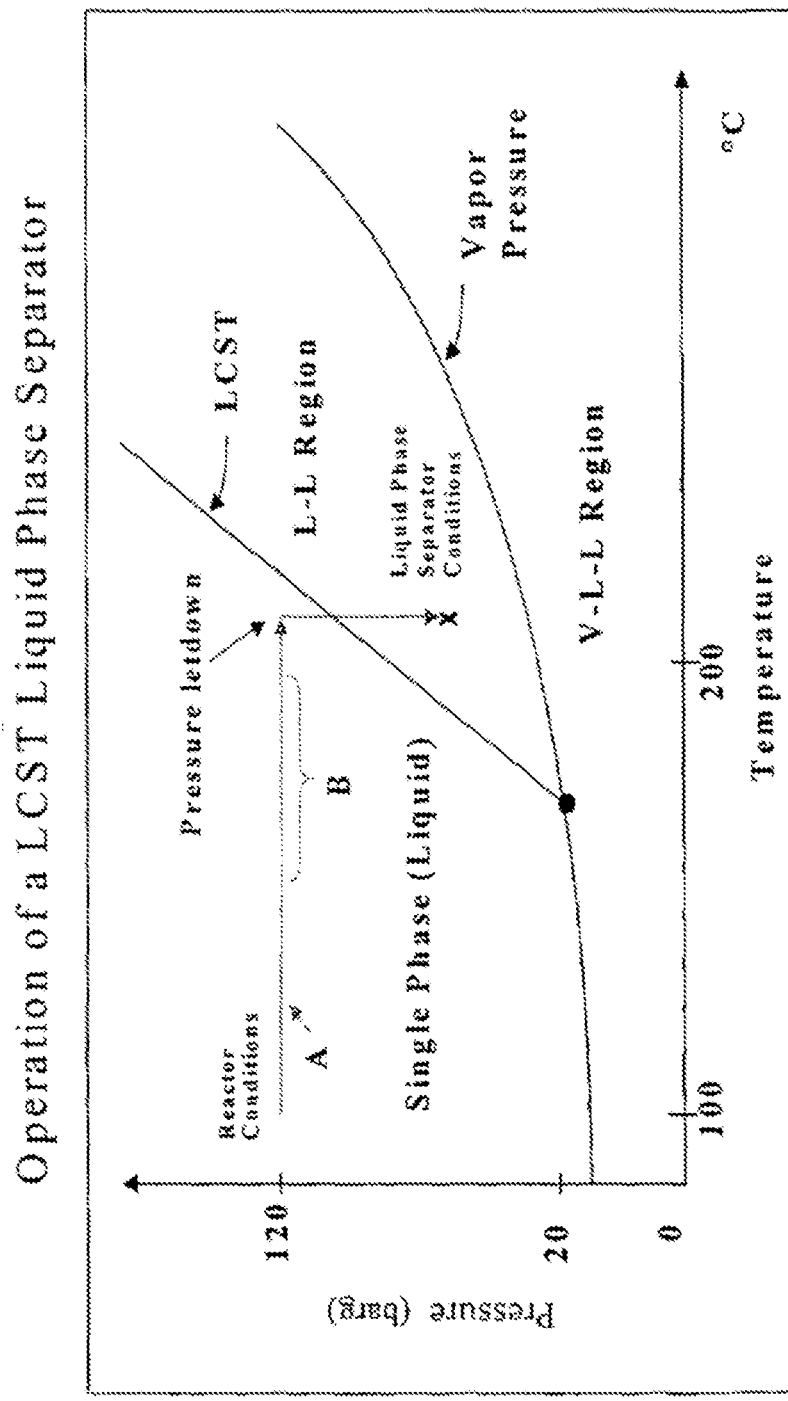
FIG. 3 is a phase diagram illustrating the operation of a liquid phase separator that may be used in processes and systems according to one or more embodiments of the present invention.

Liquid phase separation may be achieved by passing the multimodal blend stream through a LCST boundary as illustrated in FIG. 3. In this illustrative example, polymerization takes place at 100 or 120 bar in the polymerization reactor(s) at the pressure also prevailing upstream of the pressure let-down device at a level as shown by line A. The temperature is maintained and/or raised to a range marked by the bracket shown at B to between 150° C. and 200° C. or 220° C. At the prevailing temperature, the pressure is dropped along the arrow to a level marked X. As the temperature is reduced across the letdown valve from 100 bar to 40 bar, the polymerization mixture passes from a homogeneous single phase, through the lower critical solution temperature boundary marked LCST, to a two-phase (L-L) region. That is, for a given temperature, the pressure starts at a pressure above the highest of the pressure-temperature curves representing the upper critical solution temperature (UCST), the LCST, and the vapor pressure, and the pressure after the let-down for the given temperature is below the pressure-temperature curve representing the spinodal boundary and above the pressure-temperature curve representing the vapor pressure. The pressure drop is sufficiently fast to avoid formation of a continuous polymer and to form a discontinuous solvent/monomer phase. The pressure drop across the region bounded by the LCST (binodal) boundary and the spinodal boundary may be especially rapid to induce phase separation by spinodal decomposition, which leads to rapid phase separation and settling.

Level X is above another phase boundary marked Vapor pressure below which the mixture enters a V-L-L region in which it is part vapor, and part two phase liquid. The pressure at level X at the exit of the separator is sufficiently high so that no vapor is formed.

Past experimental measurements have shown that while the concentration of polymer in the lean phase is a function of product family, ranging from about 300 wppm for high molecular weight propylene-ethylene elastomers (i.e., propylene-ethylene elastomers having a weight average molecular weight in the range of 100 k-300 k g/mole) to about 1000 wppm for ethylene propylene diene monomer rubber ("EPDM") and plastomers, the molecular weight of the polymer fraction in the lean phase measured by gel permeation chromatography has generally been less than 10,000 g/mole. See, e.g., U.S. Pat. No. 7,163,989. It was therefore expected that liquid-phase separation of lower molecular weight polymers, such as polymers having a weight average molecular weight in the range of 5,000 g/mole to 100,000 g/mole, would result in a lean phase polymer concentration that was substantially higher than that of the higher molecular weight propylene-ethylene elastomers, EPDM, and plastomers. Such a result would have been even more undesirable for the processing of multimodal polymer blends in embodiments in which one of the polymers has a significantly lower weight average molecular weight than the other polymer or polymers. Surprisingly, as documented in Example One and Example Two, it was discovered that this was not the case.

It has therefore been determined that employing a liquid-phase separation vessel 60 that utilizes spinodal decomposition to achieve the formation of two liquid phases may be an effective method for separating solvent from multimodal polymer blends, particularly in cases in which one of the polymers of the blend has a weight average molecular weight less than 100,000 g/mole, and even more particularly between 10,000 g/mole and 60,000 g/mole. It was also found that the concentration of polymer in the polymer lean phase may be further reduced by catalyst selection. Catalysts of Formula I (described in the Catalysts and Activators section of this disclosure), particularly dimethylsilyl bis(2-methyl-5-phenylindenyl)zirconium dichloride, dimethylsilyl bis(2-methyl-5-phenylindenyl)hafnium dichloride, dimethylsilyl bis(2-methyl-5-phenylindenyl)zirconium dimethyl, and dimethylsilyl bis(2-methyl-5-phenylindenyl)hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-5-phenylindenyl)zirconium dichloride, dimethylsilyl bis(2-methyl-5-phenylindenyl) hafnium dichloride, dimethylsilyl bis(2-methyl-5-phenylindenyl)zirconium dimethyl, and dimethylsilyl bis(2-methyl-5-phenylindenyl)hafnium dimethyl.

Referring back to FIG. 1, upon exiting the liquid-phase separation vessel 60, the polymer rich stream 62 may then be fed to a devolatilizing vessel 70 for further polymer recovery. In any embodiment, the polymer rich stream 62 may also be fed to a low pressure separator before being fed to the inlet of the devolatilizing vessel 70. While in the vessel, the polymer composition may be subjected to a vacuum in the vessel such that at least a portion of the solvent is removed from the polymer composition and the temperature of the polymer composition is reduced, thereby forming a second polymer composition comprising the multimodal polymer blend and having a lower solvent content and a lower temperature than the polymer composition as the polymer composition is introduced into the vessel. The polymer composition may then be discharged from the outlet of the vessel via a discharge stream 72.

The devolatilizing vessel 70 may be a devolatilizing device that is known in the art. Any such device capable of removing solvent from a polymer melt to achieve the evaporative cooling described herein may be used. Certain of those devices are described in more detail below.

In any embodiment, the devolatilizing vessel may include a vacuum chamber having an inlet for receiving a polymer melt, an outlet for discharging a polymer melt, a vacuum port through which volatiles may be removed, and a stirrer shaft port for the entry of a stirrer shaft. The stirrer shaft may pass through at least one stirrer shaft port, extend into the vacuum chamber and carry an agitation means, such as one or more: conventional circular or elliptical paddles, conventional blades, conventional rods, or combinations thereof. The agitation means include any conventional agitation apparatus known to those skilled in the art. The devolatilizer may include a motor located outside of the vacuum chamber for rotating shaft.

The devolatilizer may also comprise a screw shaft associated with the outlet from the vacuum chamber for driving the polymer through the outlet. In that case the vacuum chamber will also have a screw shaft port through which the screw shaft passes into the chamber, and that screw shaft port will also include a screw shaft seal having an external portion outside of the vacuum chamber. Preferably, the devolatilizer also comprises means, such as an enclosure supplied with a low oxygen content gas, for blanketing the external portion of the screw shaft seal with the low oxygen content gas.

Typically, the vacuum chamber is generally cylindrical and is horizontal such that the axis of the cylinder lies in a horizontal plane, and the stirrer shaft also extends horizontally and optionally coincides with axis of the cylinder.

The provided apparatus and process use any suitable low oxygen content gas. Preferably, the low oxygen content gas has less than 3 wt % oxygen, preferably less than 0.5 wt % oxygen. More preferably, the low oxygen content gas is substantially free or completely free (0.0 wt %) of oxygen. Low oxygen content gases include conventional gases that do not contain oxygen, such as helium, argon, nitrogen, steam, carbon dioxide, or combinations thereof. Preferably, the low oxygen content gas is nitrogen.

Optionally, the internal volume of the vacuum chamber is at least 2 $m^3$, for example, at least 4 $m^3$ and is optionally at most 15 $m^3$, for example 11 $m^3$. Optionally, the vacuum chamber is generally cylindrical with a length of at least 4 m, optionally at least 6 m, and a diameter of at least 1 m.

Typically, the vacuum devolatilizer comprises or is connected to at least one pump for applying a vacuum to the vacuum chamber via the vacuum port or vacuum ports.

Figure 2:
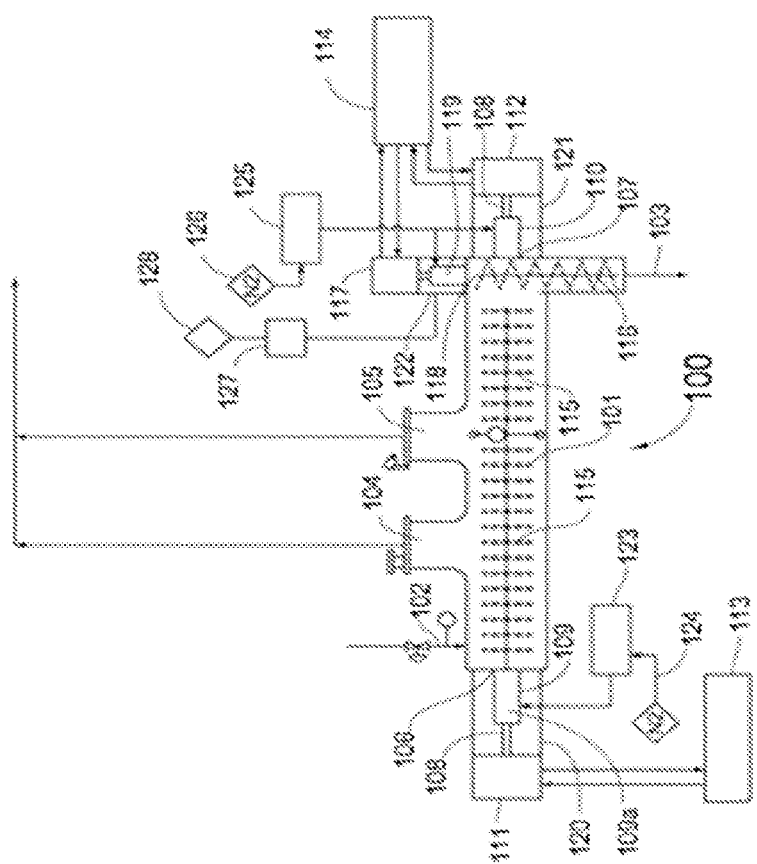
FIG. 2 depicts a generalized devolatilizing device suitable for use in the inventive processes and systems.

FIG. 2 shows the arrangement of an exemplary devolatilizer 100 suitable for use in the inventive processes and systems. The devolatilizer 100 includes a vacuum chamber 101 which is provided with an inlet 102 for a polymer composition comprising polymer and solvent, an outlet 103 for polymer flowing to a pelletizer and two vacuum ports 104 and 105 which are connected via conduits to a vacuum system comprising a pump. The vacuum chamber 101 is generally cylindrical and may have a length of approximately 2 to 10 meters and a diameter of over 1 meter. The vacuum chamber 101 is horizontally mounted and is provided at each end with a stirrer shaft port 106, 107. Stirrer shaft 108 extends horizontally through the stirrer shaft ports 106, 107 and is coaxial with the axis of the cylindrical vacuum chamber 101. Stirrer shaft port 106 is provided with a stirrer shaft seal 109 for sealing between the vacuum chamber 101 and the stirrer shaft 108. Stirrer shaft port 107 is provided with a similar stirrer shaft seal 110. The function of stirrer shaft seals 109 and 110 is to prevent ingress of the atmosphere external to the vacuum chamber 101 into the interior vacuum chamber 101. The vacuum devolatilizer 100 further includes two hydraulic motors 111, 112 mounted at the ends of the stirrer shaft 108 for driving the stirrer shaft 108. Those motors 111, 112 are powered by separate hydraulic drives 113 and 114, respectively. A number of paddles 115 are provided along the length of stirrer shaft 108 for agitating the polymer inside the vacuum chamber 101.

At the end of the vacuum chamber 101 remote from the inlet 102 a horizontally mounted screw shaft 116 is mounted orthogonal to the stirrer shaft 108 (in FIG. 2 the screw shaft appears in a vertical direction for clarity). Screw shaft 116 is driven by hydraulic motor 117, which is powered by hydraulic drive 114. The function of screw shaft 116 is to drive polymer out of the vacuum chamber 101 and through the outlet 103 towards the downstream pelletizer. The screw shaft 116 enters the vacuum chamber through a screw shaft port 118, which is provided with a screw shaft seal 119.

Seal 109 has a portion 109a that extends outside the vacuum chamber 101. The external portion 109a of the seal 109 is contained within enclosure 120, which is a cylindrical enclosure extending from the end of the vacuum chamber 101 to the housing of the motor 111. When the devolatilizer 100 is in operation, the enclosure 120 is supplied with nitrogen from a nitrogen source to maintain an inert atmosphere within the enclosure 120, thereby blanketing the external portion 109a of the seal 109 with the inert atmosphere. In that way, any leak in seal 109 draws nitrogen from the interior enclosure 120 into the interior of the vacuum chamber 101 rather than air from the atmosphere. The nitrogen supply to enclosure 120 may be monitored by a monitor so that any sudden rises of nitrogen flow out of the enclosure 120 will be detected as an indication of a possible leak in the seal 109. In a similar way, stirrer shaft seal 110 has a portion that extends external to the vacuum chamber 101, which is enclosed inside nitrogen-filled enclosure 121, and the screw shaft seal 119 has a portion that extends external to the vacuum chamber 101 that is enclosed inside nitrogen-filled enclosure 122. Enclosures 121 and 122 may each have its own independent supply of nitrogen, each with its own independent monitor for detecting any increase in the flow of nitrogen to the enclosure.

As can be seen from FIG. 2, each of the motors 111, 112, and 117 has a housing that forms part of the enclosures 120, 121, and 122, respectively.

Seal 109 is provided with a dedicated oil injection pump 123 that feeds lubricant oil into the seal 109, thereby improving the sealing action and extending the lifetime of the seal packing. Pump 123 is an air driven plunger pump which meters an exact quantity of oil to the seal for each stroke thereby ensuring that excessive oil is not injected into the seal. Oil flow is carefully controlled to limit the ingress of seal oil into the polymer. Alternately, the oil may be pressurized with nitrogen supply 124 that applies a pressure to a reservoir of lubricant oil thereby forcing the oil at a specified pressure into the seal 109.

In a similar way seal 110 is provided with an oil pump 125 and an associated air supply or nitrogen supply 126, and seal 119 is provided with an oil pump 127 having an associated nitrogen supply 128.

During operation of the devolatilizer 100 a polymer composition comprising a semi-crystalline polymer and a solvent flows into inlet 102 of vacuum chamber 101. Inside the vacuum chamber, the polymer composition is agitated by the paddles 115 fixed to stirrer shaft 108, which may rotate at a speed of, for example, between 20 and 45 rpm. The agitation continuously exposes new surface of the polymer inside the vacuum chamber 101 and volatile solvent material is drawn off through the two vacuum ports 104, 105 toward the vacuum system, the vacuum is maintained inside the vacuum chamber 101 at a pressure of approximately 20 mmHg. The polymer flows along the length of the vacuum chamber 101 and is driven out of the end of vacuum chamber 101 by rotating screw shaft 116 through outlet 103 towards the downstream pelletizer 200.

Further embodiments and a more detailed description of the operation of devolatilizing devices suitable for use herein may be found in U.S. patent Ser. No. 12/972,140, which is incorporated by reference herein in its entirety. Suitable devolatilizing devices are available commercially from, for example, LIST USA, Inc.

Referring back to FIG. 1, the cooled discharge stream 72 may then be fed to a pelletizer 80 where the multimodal polymer blend is then discharged through a pelletization die as formed pellets 82. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. Examples of useful underwater pelletizing devices can be found in U.S. Pat. Nos. 7,033,152; 7,226,553; and 7,470,118, all of which are incorporated herein by reference.

In any embodiment, an underwater pelletizer may be used to pelletize the cooled polymer. In such embodiments, the polymer may be extruded through a pelletizing die to form strands, and the strands may then be cut by rotating cutter blades in the water box of the underwater pelletizer. Water may continuously flow through the water box to further cool and solidify the pellets and carry the pellets out of the underwater pelletizer's water box for further processing. In any embodiment, the temperature of the water in the underwater pelletizing unit may be from about 0° C. to 25° C. Preferably a water chilling system cools the water going to the underwater pelletizer water box (cutting chamber) to about 5° C.

In any embodiment, the pelletizing die may be thermally regulated by means known to those skilled in the art in order to prevent die hole freeze-off.

In any embodiment, the underwater pelletizer unit may have a chilled water slurry circulation loop. The chilled water helps eliminate the tendency of the pellets to stick together and allows the extruded polymer strands to be more cleanly cut. The chilled water slurry circulation loop may be fluidly connected with the water box of the underwater pelletizer, and may carry the pellet-water slurry to a pellet drying unit, and then recycle the water back to the underwater pelletizer. In any embodiment, the residence time of the pellets in the chilled water slurry circulation loop may be at least 10 seconds, or at least 20 seconds, or at least 30 seconds, or at least 40 seconds, or at least 50 seconds or more. Because fresh pellets may have a tendency to bridge and agglomerate if the pellets have not had adequate time to crystallize and harden, it is preferred that the pellets have sufficient residence time in the pellet water loop to harden.

In the same or other embodiments, chilled water may be used to remove the pellets from the cutter blade and transports them through a screen that catches and removes coarsely aggregated or agglomerated pellets. The water may then transport the pellets through a dewatering device and into a centrifugal dryer or fluidized bed to remove excess surface moisture from the pellets. The pellets may then pass through a discharge chute for collection or may proceed to additional processing.

The pelletizing die can be used to make pellets in various shapes including, but not limited to, spheres, rods, slats, or polygons. Preferably, near spherical pellets are made. A pellet shape that will allow the pellets to easily flow is preferred.

The speed at which the pelletizer operates is selected according to the die plate size, number of orifices in the die, and the desired pellet size and shape. The number of orifices in the die and the orifice geometry are selected as appropriate for the polymer feed flow rate and melt material and such determinations are within the knowledge and capabilities of those skilled in the art.

Incomplete crystallization of the polymer material in the pellets after the pellets have exited the pellet-water slurry loop can lead to poor pellet geometry, pellet deformation, and reduced ability of the pellets to freely flow. The degree of crystallization of the pellets is affected by residence time and temperature of the pellets. Additionally, the pellet hardness varies with residence time and temperature.

Optionally, an antiblocking agent may be added to the water in the underwater pelletizing water box or chilled water slurry loop. The addition of an antiblocking agent to the pellet water loop is useful to prevent pellets from sticking together in the loop.

A. Monomers

Polymers produced by any of the methods of the invention and/or employed in any of the compositions of the invention are preferably derived from one or more monomers selected from the group consisting of propylene, ethylene, $C_4$ to $C_{20}$ linear or branched olefins, and diolefins (particularly, $C_4$ to $C_{10}$ olefins). The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction.

Preferably, the polymer is predominantly propylene. Preferred comonomers include ethylene, butene, hexene, and octene, with ethylene being the most preferred comonomer. For propylene-based polymers, the crystallinity and heat of fusion of the polymer are affected by the comonomer content and the sequence distribution of the comonomer within the polymer. Generally, increased levels of comonomer will reduce the crystallinity provided by the crystallization of stereoregular propylene-derived sequences.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045×2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Various test methods including GPC measurements methods and methods for determining ethylene content by NMR and the DSC measurements are described in U.S. Pat. No. 6,525,157, which is incorporated by reference herein in its entirety.

B. Catalysts and Activators

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C or Si, M is a Group 3, 4, 5, or 6 transition metal, and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl)zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C or Si, M is a Group 3, 4, 5, or 6 transition metal, and $X_2$ are leaving groups. $In^1$ and $In^2$ are substituted in the 2 position by a methyl group and in the 4 position by a substituent selected from the group consisting of $C_5$ to $C_{15}$ aryl, $C_6$ to $C_{25}$ alkylaryl, and N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3',5'-di-tert-butylphenyl) indenyl) zirconium dimethyl, (dimethylsilyl)bis(2-methyl-4-(3',5'-di-tert-butylphenyl)indenyl)hafnium dimethyl, (dimethylsilyl)bis(2-methyl-4-naphthylindenyl)zirconium dimethyl, (dimethylsilyl)bis(2-methyl-4-naphthylindenyl) hafnium dimethyl, (dimethylsilyl)bis(2-methyl-4-(N-carbazyl)indenyl)zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f) indenyl)hafnium dimethyl, diphenylsilyl bis(2-(methyl)-5,5,8,8-tetramethyl-5,6,7,8-tetrahydrobenz(f)indenyl)hafnium dimethyl, diphenylsilyl bis(5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$— group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

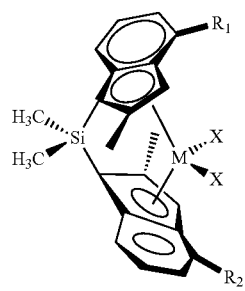

Formula I

In any embodiment, X is a Group IV transition metal atom, preferably a Group IVB transition metal, more preferably hafnium or zirconium, and R3 and R4 are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-5-phenylindenyl)zirconium dichloride, dimethylsilyl bis(2-methyl-5-phenylindenyl)zirconium dimethyl, dimethylsilyl bis(2-methyl-5-phenylindenyl)hafnium dichloride, and dimethylsilyl bis(2-methyl-5-phenylindenyl)hafnium dimethyl.

Another advantageous catalyst that may be employed in any embodiment is illustrated in Formula II.

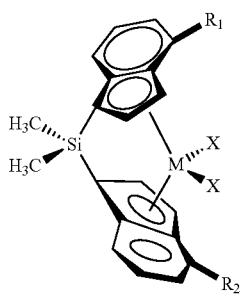

Formula II

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula II are dimethylsilylbis(indenyl)hafnium dimethyl, dimethylsilylbis(indenyl)hafnium dichloride, dimethylsilylbis(indenyl)zirconium dimethyl, and dimethylsilylbis(indenyl)zirconium dichloride.

In any embodiment, one or more of the polymers may also be produced using the catalyst illustrated in Formula III.

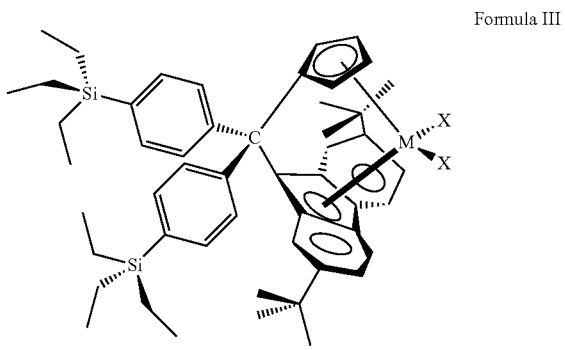

Formula III

In any embodiment, M is a Group IV transition metal atom, preferably a Group IV transition metal, more preferably hafnium or zirconium, and X are each an alkyl, preferably methyl, or a halide ion, preferably chloride or fluoride. Methyl or chloride leaving groups are most preferred. Particularly advantageous species of Formula III are 1,1'-bis(4-triethylsilylphenyl)methylene-(cyclopentadienyl)(2,7-di-tertiary-butyl-9-fluorenyl)hafnium dimethyl; 1,1'-bis(4-triethylsilylphenyl)methylene-(cyclopentadienyl)(2,7-di-tertiary-butyl-9-fluorenyl)hafnium dichloride; 1,1'-bis(4-triethylsilylphenyl)methylene-(cyclopentadienyl)(2,7-di-tertiary-butyl-9-fluorenyl)zirconium dimethyl; and 1,1'-bis(4-triethylsilylphenyl)methylene-(cyclopentadienyl)(2,7-di-tertiary-butyl-9-fluorenyl)zirconium dichloride.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalysts of Formula I, Formula II, and Formula III. A particularly advantageous activator is dimethylaniliniumtetrakis(heptafluoronaphthyl)borate.

Suitable activators for the processes of the present invention also include alominoxanes (or alumoxanes) and aluminum alkyls. Without being bound by theory, an alumoxane is typically believed to be an oligomeric aluminum compound represented by the general formula $(R^x\text{—Al—O})_n$, which is a cyclic compound, or $R^x(R^x\text{—Al—O})_n AlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^x JZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

C. Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inled to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

D. Polymers

The novel polymers that may be manufactured in the methods disclosed herein generally include any of the polymers formed of the monomers disclosed herein. Preferred polymers are semi-crystalline propylene-based polymers. In any embodiment, the polymers may have a relatively low molecular weight, preferably about 100,000 g/mole or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries.

"Polypropylene" as used herein includes homopolymers and copolymers of propylene or mixtures thereof. Products that include one or more propylene monomers polymerized with one or more additional monomers may be more commonly known as random copolymers (RCP) or impact copolymers (ICP). Impact copolymers are also known in the art as heterophasic copolymers. "Propylene-based," as used herein, is meant to include any polymer comprising propylene, either alone or in combination with one or more comonomers, in which propylene is the major component (i.e., greater than 50 mole % propylene).

In any embodiment, one or more polymers of the blend may comprise one or more propylene-based polymers, which comprise propylene and from about 5 mole % to about 30 mole % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mole %, at least about 6 mole %, at least about 7 mole %, or at least about 8 mole %, or at least about 10 mole %, or at least about 12 mole % ethylene-derived or hexene-derived units. In those or other embodiments, the copolymers may include up to about 30 mole %, or up to about 25 mole %, or up to about 22 mole %, or up to about 20 mole %, or up to about 19 mole %, or up to about 18 mole %, or up to about 17 mole % ethylene-derived or hexene-derived units, where the percentage by weight is based upon the total weight of the propylene-derived and α-olefin derived units. Stated another way, the propylene-based polymer may include at least about 70 mole %, or at least about 75 mole %, or at least about 80 mole %, or at least about 81 mole % propylene-derived units, or at least about 82 mole % propylene-derived units, or at least about 83 mole % propylene-derived units; and in these or other embodiments, the copolymers may include up to about 95 mole %, or up to about 94 mole %, or up to about 93 mole %, or up to about 92 mole %, or up to about 90 mole %, or up to about 88 mole % propylene-derived units, where the percentage by weight is based upon the total weight of the propylene-derived and alpha-olefin derived units. In any embodiment, the propylene-based polymer may comprise from about 5 mole % to about 25 mole % ethylene-derived or hexene-derived units, or from about 8 mole % to about 20 mole % ethylene-derived or hexene-derived units, or from about 12 mole % to about 18 mole % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the first crystallization temperature (Tc1) of the polymer (as determined by viscosity curve) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the polymer is greater than about 0° C., or greater than about 5° C., or greater than about 10° C., or greater than about 15° C., or greater than about 20° C.

In other embodiments, the Tc1 lower limit of the polymer may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or or greater than about 20° C.

In other embodiments, the Tc2 lower limit of the polymer may be 0° C., 5° C., 10° C., 20° C., 30° C., 40° C., 50° C., 60° C., and 70° C.; and the Tc2 upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers or sequences that are mainly amorphous in the undeformed state, but upon stretching or annealing, become crystalline. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a triad tacticity of three propylene units, as measured by $^{13}$C NMR, of 75% or greater, 80% or greater, 85% or greater, 90% or greater, 92% or greater, 95% or greater, or 97% or greater. In one or more embodiments, the triad tacticity may range from about 75% to about 99%, or from about 80% to about 99%, or from about 85% to about 99%, or from about 90% to about 99%, or from about 90% to about 97%, or from about 80% to about 97%. Triad tacticity is determined by the methods described in U.S. Patent Application Publication No. 2004/0236042.

The semi-crystalline polymer may have a tacticity index m/r ranging from a lower limit of 4, or 6 to an upper limit of 8, or 10, or 12. The tacticity index, expressed herein as "m/r", is determined by $^{13}$C nuclear magnetic resonance ("NMR"). The tacticity index m/r is calculated as defined by H. N Cheng in 17 MACROMOLECULES 1950 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature as measured per the ASTM D-792 test method.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Techniques for determining the molecular weight may be found in U.S. Pat. No. 4,540,753 (Cozewith, Ju, and Verstrate) and in Macromolecules, 1988, Vol. 21, p. 3360 (Verstrate et al.). For example, molecular weight may be determined by size exclusion chromatography (SEC) by using a Waters 150 gel permeation chromatograph equipped with the differential refractive index detector and calibrated using polystyrene standards.

In one or more embodiments, the semi-crystalline polymer may have a viscosity (also referred to a Brookfield viscosity or melt viscosity), measured at 190° C. and determined according to ASTM D-3236 from about 100 cP to about 1,000,000,000 cP, or from about 1,000 to about 100,000,000 cP, or from about 2,000 to about 10,000,000 cP, or from about 2,500 to about 7,500,000 cP, or from about 3,000 to about 5,000,000 cP, or from about 3,500 to about 3,000,000 cP, or from about 4,000 to about 1,000,000 cP, or from about 4,500 to about 750,000 cP, or from about 5,000 to about 500,000 cP, or from about 5,500 to about 450,000 cP, or from about 6,000 to about 400,000 cP.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by an viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

E. Blends

In any embodiment, one or more of the polymers described herein may be blended with another polymer, such as another polymer described herein, to produce a physical blend of polymers, preferably a multimodal polymer blend. The term "blend" as used herein refers to a mixture of two or more polymers. The term "multimodal" as used herein refers to a blend of two or more distinct polymer species in which each species is distinguishable from another species present in the blend on the basis of at least one chemical or physical property selected from the group consisting of molecular weight, melt viscosity, comonomer content, heat of fusion, and crystallinity.

In any embodiment, the first polymer and second polymer of the blend may have a difference in heat of fusion of about 25 J/g or more, or more preferably about 30 J/g or more. In any embodiment, the first polymer may have a heat of fusion of about 60 J/g or more and the second polymer may have a heat of fusion of about 30 J/g or less. For example, the first polymer may have a heat of fusion of about 65 to about 85 J/g and the second polymer may have a heat of fusion of about 10 J/g to about 20 J/g. The first and second polymer may each be, independently, a homopolymer of propylene or a copolymer of propylene and ethylene or a $C_4$ to $C_{10}$ olefin. In any embodiment, each polymer of the blend may have a propylene content of more than 50 mole %.

Particularly advantageous adhesive properties can be achieved by employing a multimodal polymer blend that employs an exceptionally low crystalline propylene-based polymer in combination with a higher crystalline propylene-based polymer. In any embodiment, the exceptionally low crystalline propylene-based polymer may be a homopolymer of propylene or a copolymer of propylene and ethylene or a $C_4$ to $C_{10}$ olefin, and has a heat of fusion of about 15 J/g or less. In any embodiment, the exceptionally low crystalline propylene-based polymer may be a homopolymer of propylene or a copolymer of propylene and ethylene, butene, hexene, or octene. In any embodiment, the exceptionally low crystalline propylene-based may be a homopolymer of propylene or a copolymer of propylene and ethylene. In any embodiment, the exceptionally low crystalline propylene-based polymer may have a propylene content of more than 50 mole %.

In any embodiment, the higher crystalline propylene-based polymer that is blended with the exceptionally low crystalline propylene-based polymer may be a homopolymer of propylene or a copolymer of propylene and ethylene or a $C_4$ to $C_{10}$ olefin, and has a heat of fusion of about 50 J/g or more, or 55 J/g or more, or 60 J/g or more, or 65 J/g or more, or 75 J/g or more. In an exemplary embodiment, the higher crystalline propylene-based polymer has a heat of fusion of about 65 J/g to about 85 J/g. In any embodiment, the higher crystalline propylene-based polymer may be a homopolymer of propylene or a copolymer of propylene and ethylene, butene, hexene, or octene. In any embodiment, the higher crystalline propylene-based polymer is a homopolymer of propylene or a copolymer of propylene and ethylene. In any embodiment, the higher crystalline propylene-based polymer may have a propylene content of more than 50 mole %.

In addition, particularly advantageous adhesive properties can be achieved by using an exceptionally high crystalline propylene-based polymer in combination with a lower crystalline propylene-based polymer. In any embodiment, the exceptionally high crystalline propylene-based polymer may be a homopolymer of propylene or a copolymer of propylene and ethylene or a $C_4$ to $C_{10}$ olefin, and has a heat of fusion of about 80 J/g or more. In any embodiment, the exceptionally high crystalline propylene-based polymer may be a homopolymer of propylene or a copolymer of propylene and ethylene, butene, hexene, or octene. In any embodiment, the exceptionally high crystalline propylene-based polymer is a homopolymer of propylene or a copolymer of propylene and ethylene. In any embodiment, the exceptionally high crystalline propylene-based polymer may have a propylene content of more than 50 mole %.

In any embodiment, the lower crystalline propylene-based polymer that is blended with the exceptionally high crystalline propylene-based polymer may be a homopolymer of propylene or a copolymer of propylene and ethylene or a $C_4$ to $C_{10}$ olefin, and has a heat of fusion of about 50 J/g or less, or more preferably about 25 J/g or less. In an exemplary embodiment, the lower crystalline propylene-based polymer has a heat of fusion of about 10 J/g to about 20 J/g. In any embodiment, the lower crystalline propylene-based polymer may be a homopolymer of propylene or a copolymer of propylene and ethylene, butene, hexene, or octene. In any embodiment, the lower crystalline propylene-based polymer is a homopolymer of propylene or a copolymer of propylene and ethylene. In any embodiment, the lower crystalline propylene-based polymer may have a propylene content of more than 50 mole %. In any embodiment, the lower crystalline propylene-based polymer has a heat of fusion of 45 J/g or less, 40 J/g or less, 35 J/g or less, or 30 J/g or less.

The relative weight percentages of polymers of blend may vary depending on the application of the hot melt adhesive formulation. In any embodiment, the higher crystalline polymer may about 10% to about 90% of the polymer blend, or about 20% to about 80% of the polymer blend, or about 30% to about 70% of the polymer blend, or about 40% to about 60% of the polymer blend.

II. Blended Multimodal Polymer Products

Blended multimodal polymer products are also provided. In any embodiment, the multimodal polymer product may be produced by any of the foregoing methods. For example, multimodal polymer products may be produced using any of the previously described monomers, using any of the described catalyst systems, and/or using any of the previously described polymer blends. In any embodiment, the multimodal polymer product may be produced by combining product streams of two or more reactors in parallel to form a blended stream, and then pelletizing the blended stream to produce polymeric pellets. In any embodiment, the blended stream may be fed to a liquid-phase separator to remove a portion of solvent from the blended stream prior to pelletizing. In any embodiment, the blended stream may be fed to a devolatilizing device to reduce the temperature of the stream and remove solvent from the blended stream prior to pelletizing.

In any embodiment, the blended multimodal polymer product may comprise a first polymer, wherein the first polymer is a copolymer of propylene and ethylene or a $C_4$ to $C_{10}$ olefin, and a second polymer in a second reactor in parallel with the first reactor, wherein the second polymer is a copolymer of propylene and ethylene or a $C_4$ to $C_{10}$ olefin, wherein the first polymer and second polymer have a difference in heat of fusion of about 25 J/g or more. In any embodiment, the difference in heat of fusion between the first polymer and second polymer may be about 30 J/g or more.

In any embodiment, the first polymer may have a heat of fusion of about 60 J/g or more, and the second polymer may have a heat of fusion of about 30 J/g or less. In any embodiment, the first polymer may have a heat of fusion of about 80 J/g or more, and the second polymer may have a heat of fusion of about 50 J/g or less. In any embodiment, the first polymer may have a heat of fusion of about 50 J/g or more, and the second polymer may have a heat of fusion of about 15 J/g or less. In any embodiment, the first polymer may have a heat of fusion of about 65 J/g to about 85 J/g and the second polymer may have a heat of fusion of about 10 J/g to about 20 J/g.

In any embodiment, the blended multimodal polymer product may comprise a plurality of pellets comprising the multimodal polymer blend. In any embodiment, the pellets may consist essentially of the polymer blend, optionally including stabilizing additives such as antioxidants. In other embodiments, the pellets may also include one or more waxes and/or tackifiers.

In any embodiment, the pellets may be used in a hot melt adhesive application system to produce an adhesive. The adhesive may be applied to and used to bond together various substrates, including but not limited to paper-based packages, polymeric films, cellulosic and polymeric nonwoven materials, book bindings and wood.

III. Specific Embodiments

The invention may also be understood with relation to the following specific embodiments:

Paragraph A: A method of making a multimodal polymer product comprising:
producing a first polymer in a first reactor, wherein the first polymer is a propylene copolymer of propylene having an ethylene or a $C_4$ to $C_{10}$ olefin comonomer;
producing a second polymer in a second reactor in parallel with the first reactor, wherein the second polymer is a propylene copolymer of propylene having an ethylene or a $C_4$ to $C_{10}$ olefin comonomer, and wherein the first polymer and second polymer have a difference in heat of fusion of about 25 J/g or more;
combining the first polymer and the second polymer to form a multimodal polymer blend; and
pelletizing the multimodal polymer blend to form a plurality of pellets comprising the multimodal polymer blend.

Paragraph B: The method of Paragraph A, wherein the difference in heat of fusion between the first polymer and second polymer is about 30 J/g or more.

Paragraph C: The method of Paragraph B, wherein the first polymer has a heat of fusion of about 60 J/g or more, and the second polymer has a heat of fusion of about 30 J/g or less.

Paragraph D: The method of Paragraph C, wherein the first polymer has a heat of fusion of about 65 J/g to about 85 J/g and the second polymer has a heat of fusion of about 10 J/g to about 20 J/g.

Paragraph E: The method of Paragraph B, wherein the first polymer has a heat of fusion of about 80 J/g or more, and the second polymer has a heat of fusion of about 50 J/g or less.

Paragraph F: The method of Paragraph B, wherein the first polymer has a heat of fusion of about 50 J/g or more, and the second polymer has a heat of fusion of about 15 J/g or less.

Paragraph G: The method of any of Paragraphs A-F, further comprising:
providing a vessel having an inlet and an outlet;
after combining the first polymer and the second polymer to form the multimodal polymer blend and prior to pelletizing the multimodal polymer blend, introducing a first polymer composition comprising the multimodal polymer blend and a solvent into the inlet of the vessel;
subjecting first polymer composition to a vacuum in the vessel such that at least a portion of the solvent is removed from the first polymer composition and the temperature of the first polymer composition is reduced, thereby forming a second polymer composition comprising the multimodal polymer blend and having a lower solvent content and a lower temperature than the first polymer composition; and
discharging the second polymer composition from the outlet of the vessel.

Paragraph H: The method of any of Paragraphs A-G, further comprising:
providing a liquid-phase separator having an inlet, a solvent outlet, and a product outlet;
introducing the multimodal polymer blend and the solvent into the liquid-phase separator through the inlet;
operating the liquid-phase separator under conditions suitable to produce a polymer lean liquid phase and a polymer rich liquid phase;
removing a portion of the solvent from the liquid-phase separator via the solvent outlet; and
discharging the polymer rich phase from the liquid-phase separator via the product outlet.

Paragraph I: The method of any of Paragraphs A-H, further comprising:
introducing a first unsupported catalyst into the first reactor; and
introducing a second unsupported catalyst into the second reactor, wherein the first unsupported catalyst is different than the second unsupported catalyst.

Paragraph J: The method of any of claims Paragraphs A-H, further comprising:
introducing a first unsupported catalyst into the first reactor; and introducing a second unsupported catalyst into the second reactor, wherein the first unsupported catalyst is the same as the second unsupported catalyst.

Paragraph K: The method of Paragraph I or J, wherein the first unsupported catalyst is selected from the group consisting of:
dimethylsilyl bis(2-methyl-5-phenylindenyl)zirconium dichloride;
dimethylsilyl bis(2-methyl-5-phenylindenyl)zirconium dimethyl;
dimethylsilyl bis(2-methyl-5-phenylindenyl)hafnium dimethyl;
dimethylsilyl bis(2-methyl-5-phenylindenyl)hafnium dichloride;
dimethylsilylbis(indenyl)hafnium dimethyl;
dimethylsilylbis(indenyl)hafnium dichloride;
dimethylsilylbis(indenyl)zirconium dichloride; and
dimethylsilylbis(indenyl)zirconium dichloride.

Paragraph L: The method of any of Paragraphs I-K, wherein the second unsupported catalyst is selected from the group consisting of:
dimethylsilyl bis(2-methyl-5-phenylindenyl)zirconium dichloride;
dimethylsilyl bis(2-methyl-5-phenylindenyl)zirconium dimethyl;
dimethylsilyl bis(2-methyl-5-phenylindenyl)hafnium dimethyl;
dimethylsilyl bis(2-methyl-5-phenylindenyl)hafnium dichloride;
dimethylsilylbis(indenyl)hafnium dimethyl;
dimethylsilylbis(indenyl)hafnium dichloride;
dimethylsilylbis(indenyl)zirconium dichloride;
dimethylsilylbis(indenyl)zirconium dichloride;
1,1'-bis(4-triethylsilylphenyl)methylene-(cyclopentadienyl) (2,7-di-tertiary-butyl-9-fluorenyl)hafnium dimethyl;
1,1'-bis(4-triethylsilylphenyl)methylene-(cyclopentadienyl) (2,7-di-tertiary-butyl-9-fluorenyl)hafnium dichloride;
1,1'-bis(4-triethylsilylphenyl)methylene-(cyclopentadienyl) (2,7-di-tertiary-butyl-9-fluorenyl)zirconium dichloride; and
1,1'-bis(4-triethylsilylphenyl)methylene-(cyclopentadienyl) (2,7-di-tertiary-butyl-9-fluorenyl)zirconium dimethyl.

Paragraph M: The method of any of Paragraphs A-L, wherein the first polymer is a copolymer of propylene and ethylene.

Paragraph N: The method of any of Paragraphs A-M, wherein the first polymer is predominantly propylene.

Paragraph O: The method of any of Paragraphs A-N, wherein the second polymer is a copolymer of propylene and ethylene.

Paragraph P: The method of any of Paragraphs A-O, wherein the second polymer is predominantly propylene.

Paragraph Q: The method of any of Paragraphs A-P, wherein the first polymer has a melt viscosity of about 2000 cP or less.

Paragraph R: The method of Paragraph Q, wherein the first polymer has a melt viscosity of about 1000 cP or less.

Paragraph S: The method of any of Paragraphs A-Q, wherein the second polymer has a melt viscosity of about 2000 cP or less.

Paragraph T: The method of any of Paragraphs A-Q, wherein the second polymer has a melt viscosity of about 2000 cP to 20,000 cP.

Paragraph U: The method of any of Paragraphs A-T, wherein the first polymer is about 10 to about 90 wt % of the multimodal polymer blend.

Paragraph V: The method of any of Paragraphs A-U, wherein the second polymer is about 10 to about 90 wt % of the multimodal polymer blend.

Paragraph W: A multimodal polymer product produced by the method of any of claims A-V.

Paragraph X: A blended multimodal polymer product comprising:
a first polymer, wherein the first polymer is a copolymer of propylene and ethylene or a $C_4$ to $C_{10}$ olefin; and
a second polymer, wherein the second polymer is a copolymer of propylene and ethylene or a $C_4$ to $C_{10}$ olefin, and wherein the first polymer and second polymer have a difference in heat of fusion of about 25 J/g or more.

Paragraph Y: The blended multimodal polymer product of Paragraph X, wherein the difference in heat of fusion between the first polymer and second polymer is about 30 J/g or more.

Paragraph Z: The blended multimodal polymer product of Paragraph X, wherein the first polymer has a heat of fusion of about 60 J/g or more, and the second polymer has a heat of fusion of about 30 J/g or less.

Paragraph AA: The blended multimodal polymer product of Paragraph Z, wherein the first polymer has a heat of fusion of about 65 J/g to about 85 J/g and the second polymer has a heat of fusion of about 10 J/g to about 20 J/g.

Paragraph AB: The blended multimodal polymer product of Paragraph X, wherein the first polymer has a heat of fusion of about 80 J/g or more, and the second polymer has a heat of fusion of about 50 J/g or less.

Paragraph AC: The blended multimodal polymer product of Paragraph X, wherein the first polymer has a heat of fusion of about 50 J/g or more, and the second polymer has a heat of fusion of about 15 J/g or less.

Paragraph AD: The blended multimodal polymer product of any of Paragraphs X-AC,
wherein the product is in the form of a pellet.

Paragraph AE: A method of processing a polymer comprising:
providing a liquid-phase separator having an inlet, a solvent outlet, and a product outlet; supplying a product stream downstream of one or more reactors to the inlet of the liquid-phase separator, wherein the product stream comprises a propylene-based polymer, a solvent, and unreacted propylene monomers, wherein the propylene-based polymer has a weight average molecular weight of about 100,000 g/mole or less;
operating the liquid-phase separator under conditions suitable to produce a polymer lean liquid phase and a polymer rich liquid phase;
removing a portion of the solvent from the liquid-phase separator via the solvent outlet; and
discharging the polymer rich phase from the liquid-phase separator via the product outlet.

Paragraph AF: The method of Paragraph AE, wherein the propylene-based polymer has a weight average molecular weight of about 60,000 g/mole or less.

Paragraph AG: The method of Paragraph AE or AF, wherein the concentration of the polymer in the polymer lean liquid phase is less than about 7,000 wppm.

Paragraph AH: The method of Paragraph AG, wherein the concentration of the polymer in the polymer lean liquid phase is less than about 1,000 wppm.

Paragraph AI: The method of any of Paragraphs AE-AH, wherein a catalyst is used in at least one of the one or more reactors, and wherein the catalyst is selected from the group of dimethylsilyl bis(2-methyl-5-phenylindenyl)zirconium dichloride, dimethylsilyl bis(2-methyl-5-phenylindenyl)zirconium dimethyl, dimethylsilyl bis(2-methyl-5-phenylindenyl) hafnium dichloride, and dimethylsilyl bis(2-methyl-5-phenylindenyl)hafnium dimethyl.

EXAMPLE ONE

In a pilot plant, propylene-ethylene copolymers were produced by reacting a feed stream of propylene with a feed stream of ethylene in the presence of the catalyst of Formula (I). The feed rates and feed temperature were controlled to produce a copolymer with a target heat of fusion of about 45 J/g. Over the duration of the run, melt viscosity was ramped down from about 20,000 cP to about 1000 cP by increasing the reactor temperature.

The reactor product stream containing 9-16% polymer by weight was heated to between about 200° C. and about 205° C. at a pressure of about 1600 psig. The stream was fed to a high-pressure separator where the operating pressure was 600 psig. The drop in pressure induced the stream to a two phase region beyond the lower critical solution temperature, separating the product into two liquid phases based on density. After settling, the product stream separated into a polymer rich phase that exited the bottom of the high-pressure separator and a polymer lean phase that exited overhead in the high-pressure separator.

Over the duration of the run, the molecular weight of the product was continuously reduced and the amount of polymer in the lean phase also reduced. These results are counterintuitive because the lower molecular weight polymers have larger amounts of polymers that are less than 10,000 g/mole, and, thus, higher amounts of polymer were expected to be found in the polymer lean phase as molecular weight was reduced. Without being bound by theory, it is believed that higher levels of unreacted propylene helped the polymer partition better into the rich phase and kept the polymer concentration in the lean phase low. Thus, the use of the high-pressure separator with propylene-based polymers, particularly under low reactor conversion conditions in which a large concentration of unreacted propylene remains in the product stream improves the separation in the high-pressure separator and reduces or avoids the problems associated with polymer being removed from the product stream and carried through the recirculation loop.

Figure 4:
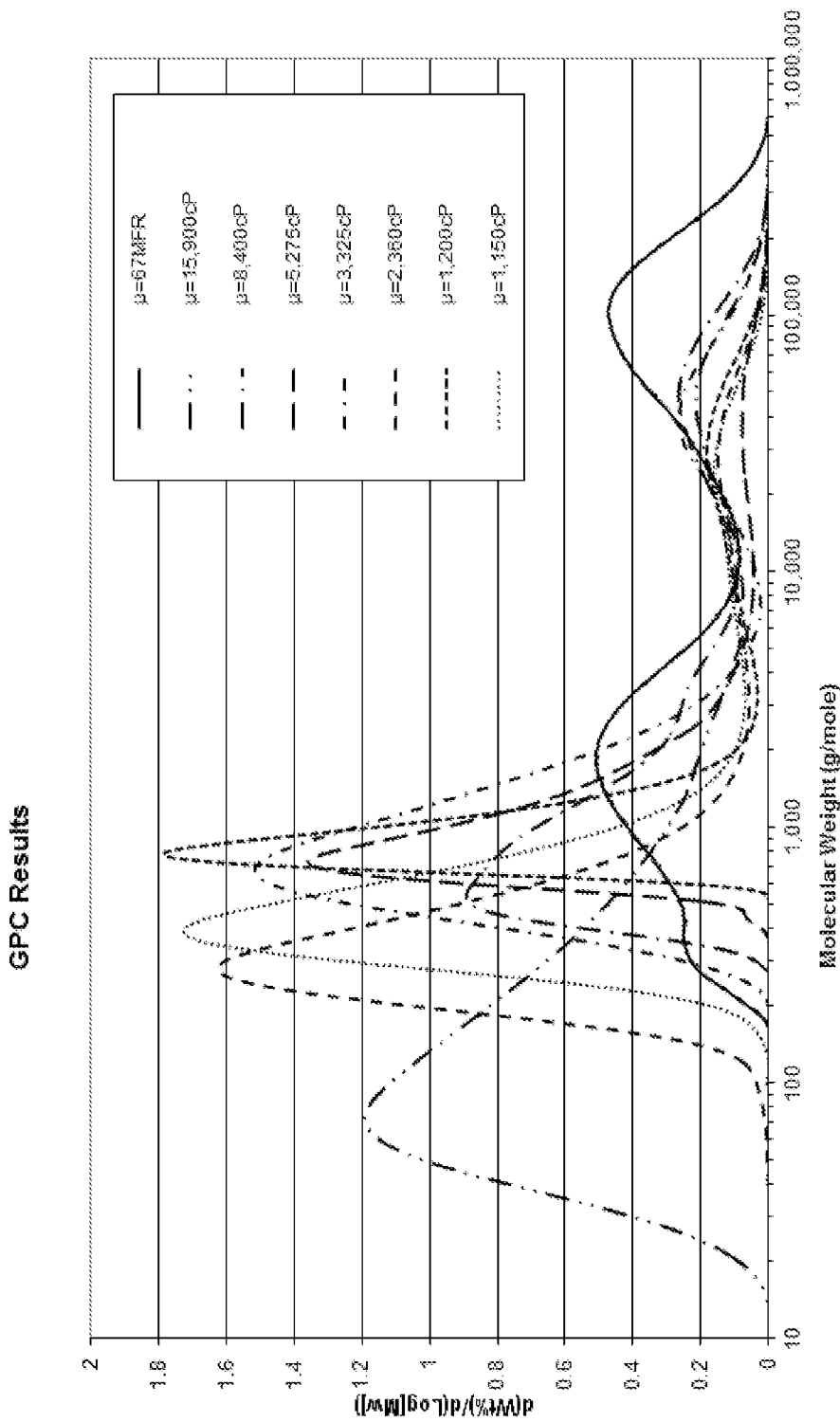
FIG. 4 is a Gel Permeation Chromatography graph illustrating the molecular weight distribution of polymer samples collected from the polymer lean phase of a high-pressure separator.

Polymer samples were obtained from the lean phase and where analyzed with Gel Permeation Chromatography (GPC) to determine the molecular weight distribution of the polymer in the lean phase. The results of this analysis are illustrated in FIG. 4. As seen in FIG. 4, as the viscosity of the polymer was lowered, the molecular weight distribution of the polymer in the lean phase is lowered. The cut-off molecular weight also shifts to a lower value (from about 10,000 g/mole to about 2,000 g/mole in FIG. 4). Thus, it can be seen that such separation is particularly effective for propylene-based polymers having a weight average molecular weight of about 100,000 g/mole or less, and even more for propylene-based polymers having a weight average molecular weight of about 60,000 g/mole or less.

EXAMPLE TWO

The concentration of polymer in the lean phase of the high-pressure separator was also analyzed for a two reactor system in a pilot plant. Five different catalyst regimes were evaluated. In each regime, the polymer's melt viscosity was held constant at about 2,000 cP.

In a first regime, propylene-ethylene copolymers were produced using the catalyst of Formula (I) in a single reactor. Copolymers were produced having heats of fusion of about 10 J/g, 25 J/g, 35 J/g, and 45 J/g. The heat of fusion of the copolymer was varied during the run by control of comonomer feed rate and feed temperatures.

In a second regime, propylene-ethylene copolymers were produced using the catalyst of Formula (II) in a single reactor. Copolymers were produced having heats of fusion of about 25 J/g and about 70 J/g. The heat of fusion of the copolymer was varied during the run by control of comonomer feed rate and feed temperatures.

In a third regime, propylene-ethylene copolymers were produced in two reactors using the catalyst of Formula (II) and were then blended. The overall heat of fusion of the blended copolymer was about 45 J/g.

In a fourth regime, propylene-ethylene copolymers were produced in two reactors. In one reactor, the copolymer was produced using the catalyst of Formula (I) and in the second reactor, the copolymer was produced using the catalyst of Formula (II). The overall heat of fusion of the blended copolymer was about 45 J/g.

In a fifth regime, propylene copolymers were produced in two reactors using the catalyst of Formula (I) and were then blended. The overall heat of fusion of the blended copolymer was about 45 J/g.

For each regime, the reactor product stream containing 9-16% polymer by weight was heated to between about 200° C. and about 205° C., at a pressure of about 1600 psig. The stream was fed to a high-pressure separator where the operating pressure was 600 psig. The drop in pressure induced the stream to a two phase region beyond the lower critical solution temperature, separating the product into two liquid phases based on density. After settling, the product stream separated into a polymer rich phase that exited the bottom of the high-pressure separator and a polymer lean phase that exited overhead in the high-pressure separator.

Figure 5:
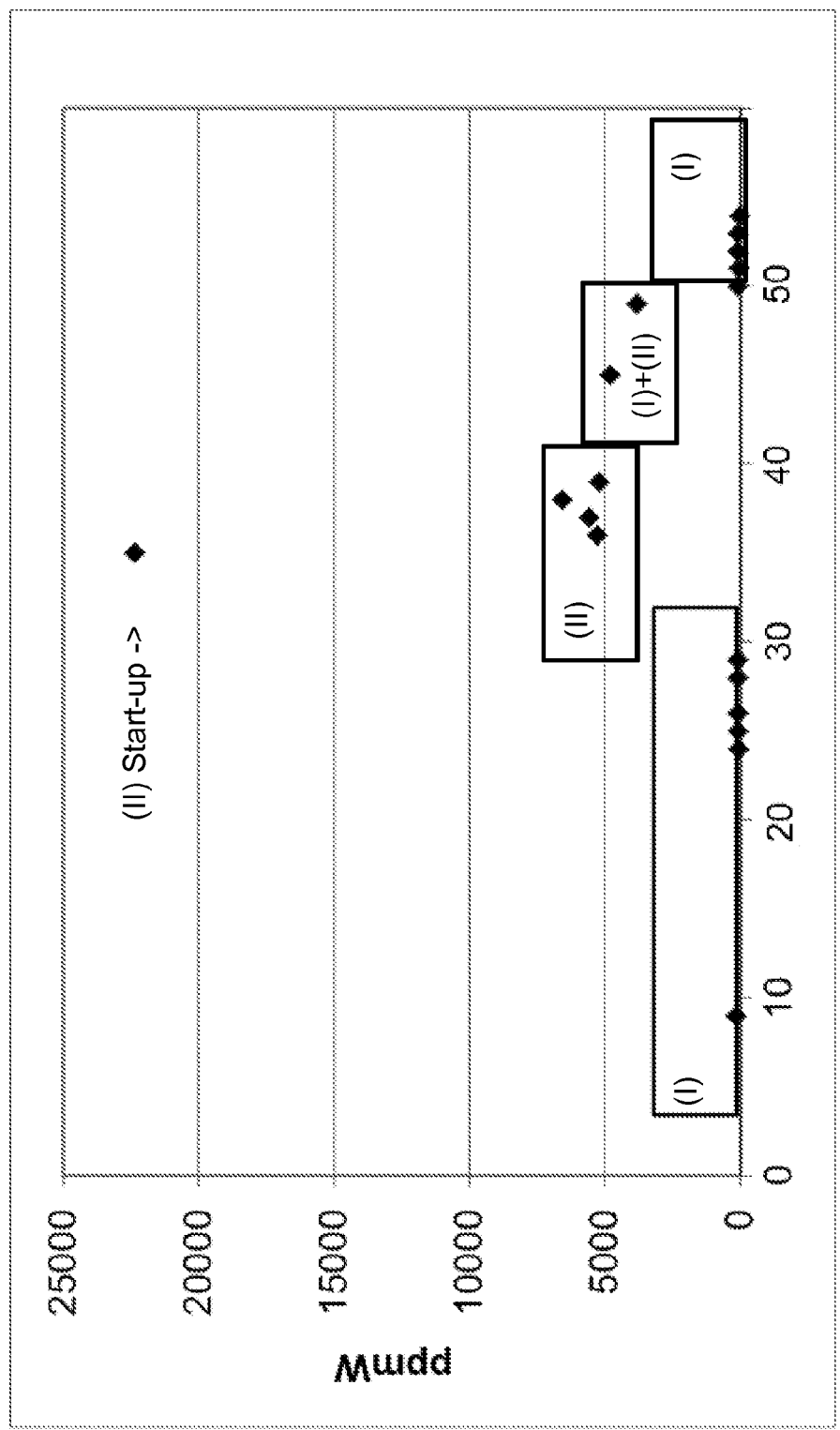
FIG. 5 is a graph illustrating the concentration of polymer in the lean phase of a high-pressure separator.

Lean phase polymer concentrations were analyzed for each run. As illustrated in FIG. 5, the lean phase polymer concentration was low for all runs except for a sample that was taken shortly after the initiation of the regime using the catalyst of Formula II. The polymers involving the catalyst of Formula (I) were all made at lower monomer conversion than the polymers involving the catalyst of Formula (II), resulting in higher monomer concentration in the high-pressure separator. The fact that the concentration of polymer in the lean phase was close to zero for the polymers produced with the catalyst of Formula (I) was particularly surprising.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A method of making a multimodal polymer product comprising:
    producing a first polymer in a first reactor, wherein the first polymer is a propylene homopolymer or a propylene copolymer having an ethylene or a $C_4$ to $C_{10}$ olefin comonomer; wherein the first polymer has a melt viscosity of about 2000 cP or less;
    producing a second polymer in a second reactor in parallel with the first reactor, wherein the second polymer is a propylene homopolymer or a propylene copolymer having an ethylene or a $C_4$ to $C_{10}$ olefin comonomer, and wherein the first polymer and second polymer have a difference in heat of fusion of about 25 J/g or more;
    combining the first polymer and the second polymer to form a multimodal polymer blend; and
    pelletizing the multimodal polymer blend to form a plurality of pellets comprising the multimodal polymer blend.

2. The method of claim 1, wherein the difference in heat of fusion between the first polymer, and second polymer is about 30 J/g or more.

3. The method of claim 2, wherein the first polymer has a heat of fusion of about 60 J/g or more, and the second polymer has a heat of fusion of about 30 J/g or less.

4. The method of claim 3, wherein the first polymer has a heat of fusion of about 65 J/g to about 85 J/g, and the second polymer has a heat of fusion of about 10 J/g to about 20 J/g.

5. The method of claim 2, wherein the first polymer has a heat of fusion of about 80 J/g or more, and the second polymer has a heat of fusion of about 50 J/g or less.

6. The method of claim 2, wherein the first polymer has a heat of fusion of about 50 J/g or more, and the second polymer has a heat of fusion of about 15 J/g or less.

7. The method of claim 1, further comprising:
    providing a vessel having an inlet and an outlet;
    after combining the first polymer and the second polymer to form the multimodal polymer blend and prior to pelletizing the multimodal polymer blend, introducing a first polymer composition comprising the multimodal polymer blend and a solvent into the inlet of the vessel;
    subjecting first polymer composition to a vacuum in the vessel such that at least a portion of the solvent is removed from the first polymer composition and the temperature of the first polymer composition is reduced, thereby forming a second polymer composition comprising the multimodal polymer blend and having a lower solvent content and a lower temperature than the first polymer composition; and
    discharging the second polymer composition from the outlet of the vessel.

8. The method of claim 1, further comprising
    providing a liquid-phase separator having an inlet, a solvent outlet, and a product outlet;
    introducing the multimodal polymer blend and a solvent into the liquid-phase separator through the inlet;
    operating the liquid-phase separator under conditions suitable to produce a polymer lean liquid phase and a polymer rich liquid phase;
    removing a portion of the solvent from the liquid-phase separator via the solvent outlet; and
    discharging the polymer rich phase from the liquid-phase separator via the product outlet.

9. The method of claim 1, further comprising:
    introducing a first unsupported catalyst into the first reactor; and
    introducing a second unsupported catalyst into the second reactor, wherein the first unsupported catalyst is different than the second unsupported catalyst.

10. The method of claim 1, further comprising:
    introducing a first unsupported catalyst into the first reactor; and
    introducing a second unsupported catalyst into the second reactor, wherein the first unsupported catalyst is the same as the second unsupported catalyst.

11. The method of claim 9, wherein the first unsupported catalyst is selected from the group consisting of:
    dimethylsilyl bis(2-methyl-5-phenylindenyl)zirconium dichloride;
    dimethylsilyl bis(2-methyl-5-phenylindenyl)zirconium dimethyl;
    dimethylsilyl bis(2-methyl-5-phenylindenyl)hafnium dimethyl;
    dimethylsilyl bis(2-methyl-5-phenylindenyl)hafnium dichloride;
    dimethylsilylbis(indenyl)hafnium dimethyl;
    dimethylsilylbis(indenyl)hafnium dichloride;
    dimethylsilylbis(indenyl)zirconium dichloride; and
    dimethylsilylbis(indenyl)zirconium dichloride.

12. The method of any of claim 10, wherein the second unsupported catalyst is selected from the group consisting of:
    dimethylsilyl bis(2-methyl-5-phenylindenyl)zirconium dichloride;
    dimethylsilyl bis(2-methyl-5-phenylindenyl)zirconium dimethyl;
    dimethylsilyl bis(2-methyl-5-phenylindenyl)hafnium dimethyl;
    dimethylsilyl bis(2-methyl-5-phenylindenyl)hafnium dichloride;
    dimethylsilylbis(indenyl)hafnium dimethyl;
    dimethylsilylbis(indenyl)hafnium dichloride;
    dimethylsilylbis(indenyl)zirconium dichloride;
    dimethylsilylbis(indenyl)zirconium dichloride;
    1,1'-bis(4-triethylsilylphenyl)methylene-(cyclopentadienyl)(2,7-di-tertiary-butyl-9-fluorenyl)hafnium dimethyl;
    1,1'-bis(4-triethylsilylphenyl)methylene-(cyclopentadienyl)(2,7-di-tertiary-butyl-9-fluorenyl)hafnium dichloride;
    1,1'-bis(4-triethylsilylphenyl)methylene-(cyclopentadienyl)(2,7-di-tertiary-butyl-9-fluorenyl)zirconium dichloride; and
    1,1'-bis(4-triethylsilylphenyl)methylene-(cyclopentadienyl)(2,7-di-tertiary-butyl-9-fluorenyl)zirconium dimethyl.

13. The method of claim 1, wherein the first polymer is a copolymer of propylene and ethylene.

14. The method of claim 13, wherein the second polymer is a copolymer of propylene and ethylene.

15. The method of claim 1, wherein the first polymer has a melt viscosity of about 1000 cP or less.

16. The method of claim 1, wherein the second polymer has a melt viscosity of about 2000 cP or less.

17. The method of claim 1, wherein the second polymer has a melt viscosity of about 2000 cP to 20,000 cP.

18. The method of claim 1, wherein the first polymer is about 10 wt % to about 90 wt % of the multimodal polymer blend.

19. The method of claim 18, wherein the second polymer is about 10 wt % to about 90 wt % of the multimodal polymer blend.

* * * * *